(12) United States Patent
Ho

(10) Patent No.: US 6,324,941 B1
(45) Date of Patent: Dec. 4, 2001

(54) SNAP-IN BICYCLE PEDAL

(76) Inventor: Hsiu-Wei Ho, No. 22, Lane 109, Feng Nien Rd, Feng Yuan, Taichung Hsien (TW)

( * ) Notice: Subject to any disclaimer, the term of this patent is extended or adjusted under 35 U.S.C. 154(b) by 0 days.

(21) Appl. No.: 09/515,100

(22) Filed: Feb. 29, 2000

(51) Int. Cl.⁷ .................................................. G05G 1/14
(52) U.S. Cl. .................................. 74/594.6; 74/594.4
(58) Field of Search ................ 74/594.4, 594.6; 36/131, 132

(56) References Cited

U.S. PATENT DOCUMENTS

| | | | | |
|---|---|---|---|---|
| 4,864,887 | * | 9/1989 | Rapisarda | 74/594.6 |
| 5,419,218 | * | 5/1995 | Romano | 74/594.6 |
| 5,423,233 | * | 6/1995 | Peyre et al. | 36/131 X |
| 5,992,266 | * | 11/1999 | Heim | 74/594.4 X |
| 6,012,356 | * | 1/2000 | Ueda | 74/594.6 |
| 6,089,122 | * | 7/2000 | Nagano | 74/594.6 |
| 6,170,357 | * | 1/2001 | Chen | 74/594.6 |
| 6,196,084 | * | 3/2001 | Ueda | 36/131 X |

FOREIGN PATENT DOCUMENTS

| | | | | |
|---|---|---|---|---|
| 0402512 | * | 12/1990 | (EP) | 74/594.6 |
| 2609270 | * | 7/1988 | (FR) | 74/594.6 |

* cited by examiner

Primary Examiner—Vinh T. Luong
(74) Attorney, Agent, or Firm—Dougherty & Troxell

(57) ABSTRACT

A snap-in bicycle pedal mainly includes a fastener portion that is screwed to a sole of a bicycle shoe and a catch portion that includes two identical and symmetrical catch bodies separately screwed to front and rear sides of a pedal shaft. Two upward projected catch lips are separately provided at least on top surface of the catch bodies and two downward projected retaining tongues are provided at bottom surface of the fastener portion. The retaining tongues and the catch lips have matched and smoothly curved contours that allow the fastener portion to be easily snap-fitted onto the catch bodies by engaging the two retaining tongues into the two catch lips or disengaged from the catch bodies by rotating the fastener portion relative to the catch portion.

8 Claims, 6 Drawing Sheets

1

SNAP-IN BICYCLE PEDAL

BACKGROUND OF THE INVENTION

The present invention relates to a snap-in bicycle pedal, and more particularly to a snap-in bicycle pedal that includes a fastener portion screwed to a sole of a bicycle shoe and a catch portion screwed to a pedal shaft, and the fastener portion may be easily snap-fitted onto the catch portion or rotated to disengage from the catch portion.

There are many differently shaped and structured snap-in bicycle pedals available in the market. One of these conventional snap-in bicycle pedals that has been known in the market for many years is shown in FIG. 1. The snap-in bicycle pedal shown in FIG. 1 includes a catch body 1 and a fastener body 2 that is screwed to a bicycle shoe. The following are some drawbacks found in such a snap-in bicycle pedal:

1. It includes complicate components and requires high manufacturing cost;
2. It includes torsion springs 11 that must be elastically pushed apart for the fastener body to engage with the catch body. The assembling of the snap-in pedal of FIG. 1 is therefore time and effort consuming;
3. The torsion springs 11 are exposed to external environment, and dust tends to deposit and accumulate on the exposed torsion springs 11 to adversely affect the elasticity thereof and accordingly the assembling of the snap-in bicycle pedal; and
4. When the fastener body 2 is assembled to the catch body 1, the fastener body 2 must be inclined for its front end 21 to downward extend into a front catch space 12 of the catch body 1. Thereafter, a rear end of the fastener body 2 is set in a rear catch space 13 of the catch body 1 by pushing the torsion springs 11 apart. Since the fastener body 2 is screwed on a bicycle shoe, it can be assembled to the catch body 1 only in one forward direction. To do so, a user must force his or her toes to point downward with the heels highly raised. Such a position is, of course, uncomfortable and will cause sore feet.

It is therefore desirable to develop an improved snap-in bicycle pedal to eliminate the drawbacks existing in the conventional snap-in bicycle pedals.

SUMMARY OF THE INVENTION

A primary object of the present invention is to provide a snap-in bicycle pedal that allows quick assembling of a fastener portion to a catch portion in different directions and quick disengaging of the fastener portion from the catch portion simply by rotating the fastener portion in one direction.

Another object of the present invention is to provide a snap-in bicycle pedal that allows easy adjustment of compressive force of the compression springs thereof, so that the fastener portion may be snap-fitted onto the catch portion with different strength depending on the user.

A further object of the present invention is to provide a snap-in bicycle pedal that allows the springs thereof to conceal in the catch portion, so that the springs are not subject to deposited and accumulated dust to effectively maintain the elasticity thereof.

A still further object of the present invention is to provide a snap-in bicycle pedal that includes components that can be easily assembled and therefore enables reduced manufacturing cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
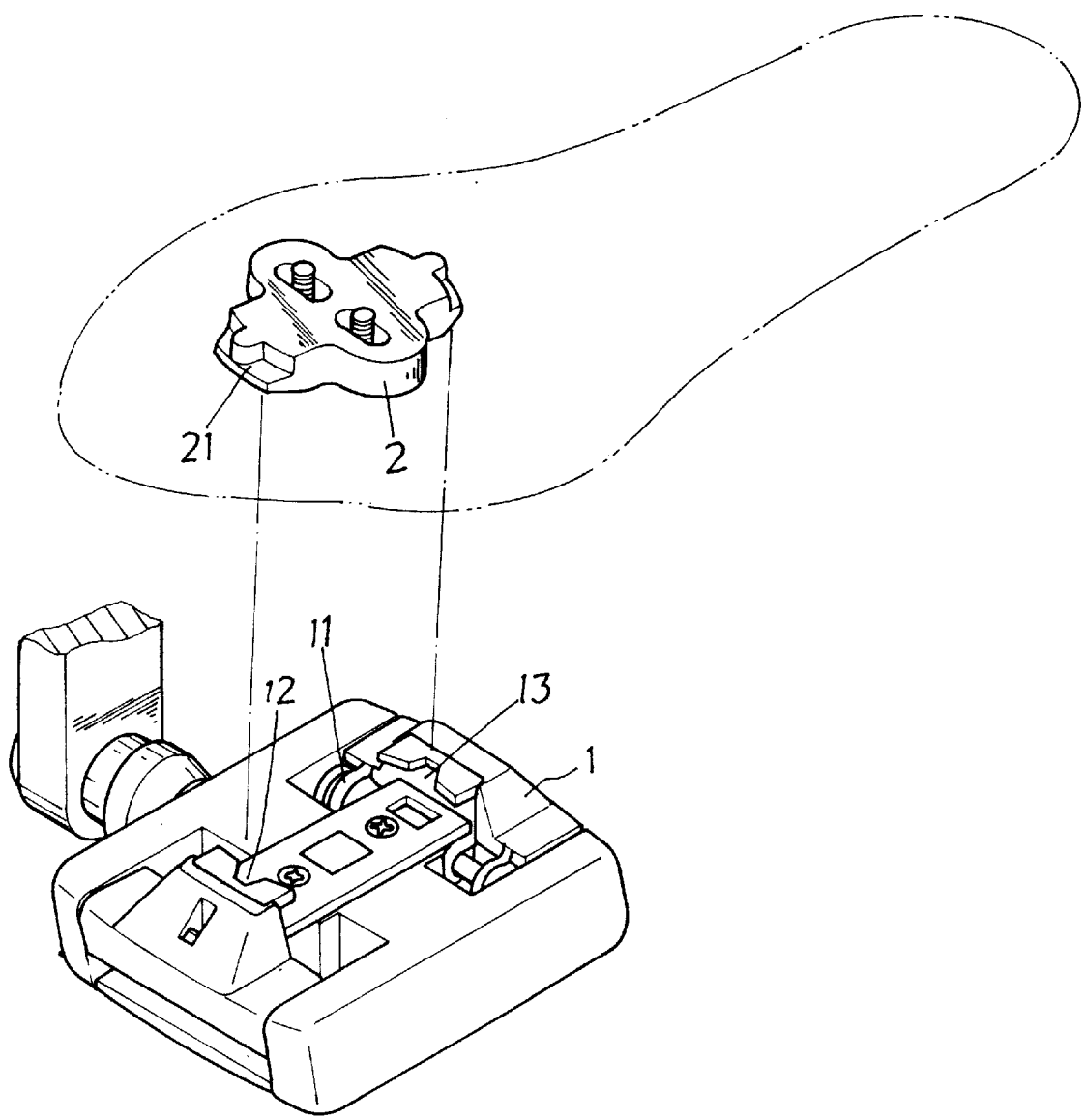
FIG. 1 illustrates the structure of a conventional snap-in bicycle pedal.
Figure 2:
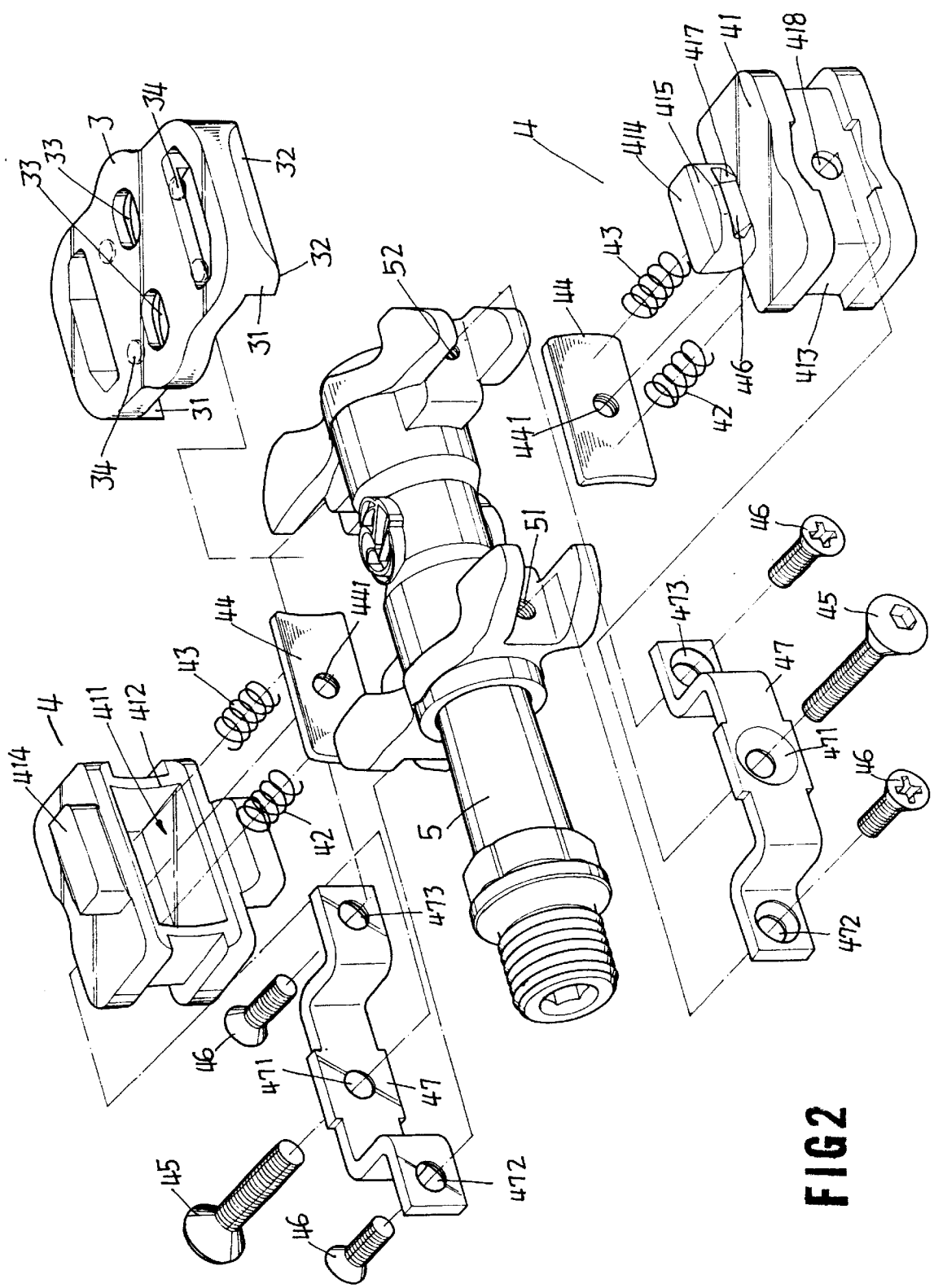
FIG. 2 is an exploded perspective of a snap-in bicycle pedal of the present invention including a catch portion and a fastener portion.

Please refer to FIG. 2 that is an exploded perspective of a snap-in bicycle pedal according to the present invention. The snap-in bicycle pedal of FIG. 2 mainly includes a fastener portion 3 and a catch portion 4 onto which the fastener portion 3 may be easily snap-fitted.

The fastener portion 3 of the snap-in bicycle pedal includes a front and a rear end, both of which are provided at an underside with a retaining tongue 31 each. Please also refer to FIGS. 3 and 4, the retaining tongue 31 each has a slightly inward inclined and curved lower outer edge 32. A central area of the fastener portion 3 is formed of, for example, a row of two through holes 33 via which fastening means, such as screws, may be extended to screw the fastener portion 3 to an underside of a sole of a bicycle shoe 6 (see FIG. 3). The fastener portion 3 is provided at predetermined positions on an underside thereof with two pairs of protuberances 34. Each pair of the protuberances 34 are separately located in front of and behind one of the through holes 33.

Figure 3:
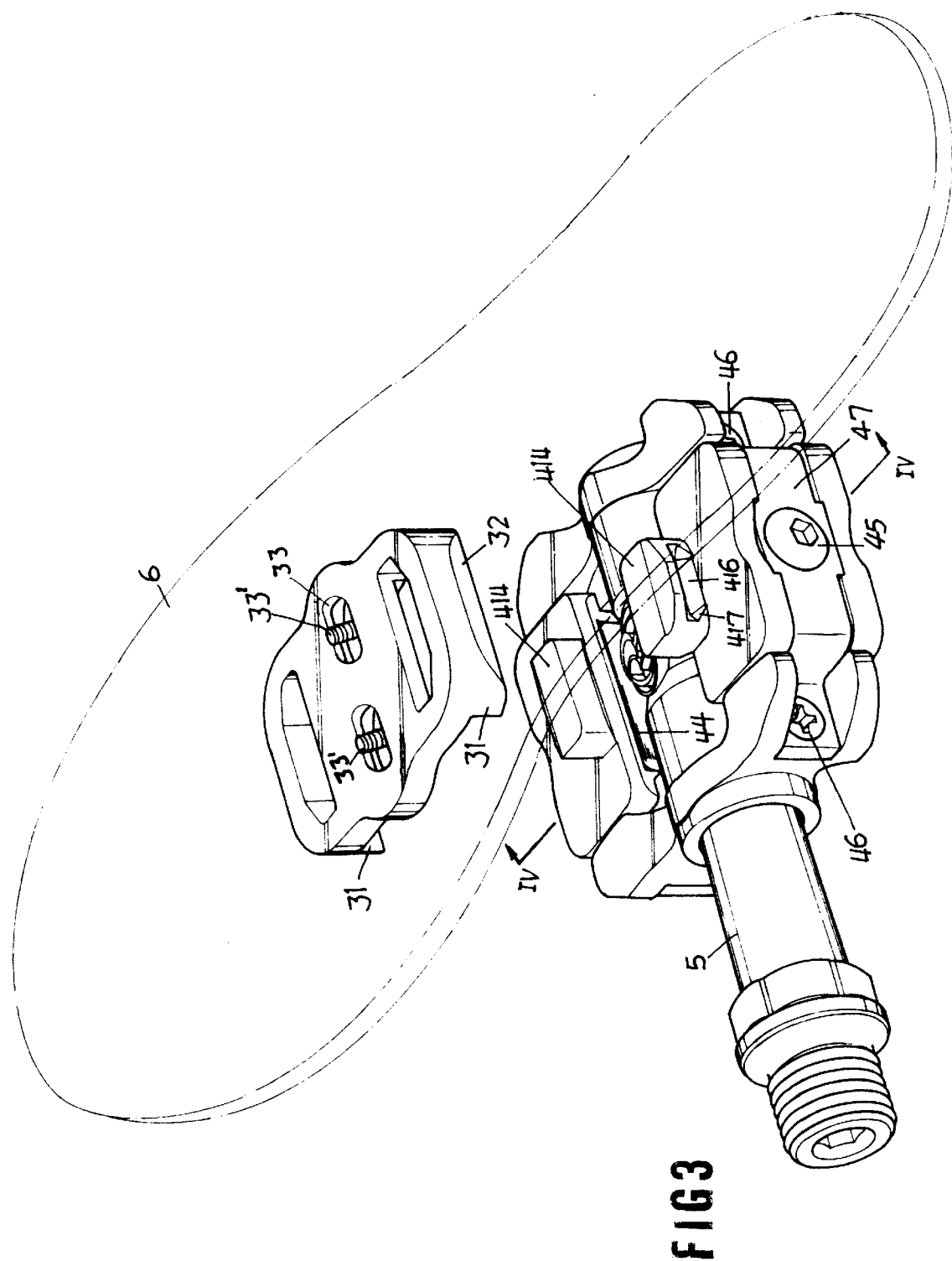
FIG. 3 illustrates the relation between the fastener portion and the catch portion of the snap-in bicycle pedal of the present invention.

The catch portion 4 includes two identical and symmetrical sets of components. The components in each set include a catch body 41, two compression springs 42 and 43, an elasticity-adjusting plate 44, an elasticity-adjusting screw rod 45, two screws 46, and a locking plate 47. The two sets of components of the catch portion 4 are separately assembled and fixedly mounted to a front and a rear side of a pedal shaft 5 to form a whole catch portion 4 as shown in FIG. 3.

The catch body 41 defines a chamber 411 of predetermined dimensions. One side of the chamber 411 facing the pedal shaft 5 is an opening 412, and the other three sides of the chamber 411 retreat inward to provide a U-shaped recess 413 around the chamber 411. Two symmetrical catch lips 414 are separately provided on the catch body 41 at least at a top thereof close to the side of the catch body 41 facing the pedal shaft 5. Three top edges of the catch lip 414 that do not adjacent to the pedal shaft 5 are rounded and together give the catch lip 414 a curved outer periphery 415. As can be clearly seen from FIGS. 3 and 4, the catch lip 414 defines a cavity 416 below the curved outer periphery 415 with an opening of the cavity 416 facing away from the pedal shaft 5. The cavity 416 has length and depth matching with that of the retaining tongue 31, and a curved interior configuration 417 matching with outer configuration of the curved lower outer edge 32 of the retaining tongue 31.

A portion of the U-shaped recess 413 around the chamber 411 facing away from the pedal shaft 5 is a back wall of the chamber 411 and has a through hole 418 provided thereat. The locking plate 47 is so bent that it can be fitly fixed in the U-shaped recess 413. The elasticity-adjusting screw rod 45 is extended through a central hole 471 of the locking plate 47 and the through hole 418 on the back wall of the chamber 411 to, on the one hand, fix the locking plate 47 to the recess 413 and, on the other hand, further screw through a threaded hole 441 centered at the elasticity-adjusting plate 44. The elasticity-adjusting plate 44 has an overall size slightly smaller than that of the opening 412 of the chamber 411 and can therefore be disposed in the chamber 411 close to the opening 412. The two compression springs 42, 43 are disposed in the chamber 411 behind the elasticity-adjusting plate 44. By changing a depth by which the elasticity-adjusting screw rod 45 is screwed into the threaded central hole 441 of the plate 44, it is possible to move the catch body 41 forward or backward relative to the pedal shaft 5 and control the extent by which the two compression springs 42, 43 are compressed, and accordingly, control the strength needed to snap-fit the fastener portion 3 onto the catch portion 4.

The locking plate 47 fitted in the U-shaped recess 413 by the screw rod 45 is further fixed to one side of the pedal shaft 5 by screwing the two screws 46 through two through holes 472, 473 provided at two outer ends of the locking plate 47 and into two holes 51, 52 correspondingly provided on the pedal shaft 5. As can be clearly seen from FIG. 3, the locking plate 47 being screwed to the pedal shaft 5 in the above-described manner actually fitly embraces the catch body 41 for the latter to firmly connect to one side of the pedal shaft 5.

There are different ways to snap-fit the fastener portion 3 onto the catch portion 4 of the snap-in bicycle pedal of the present invention.

Figure 4:
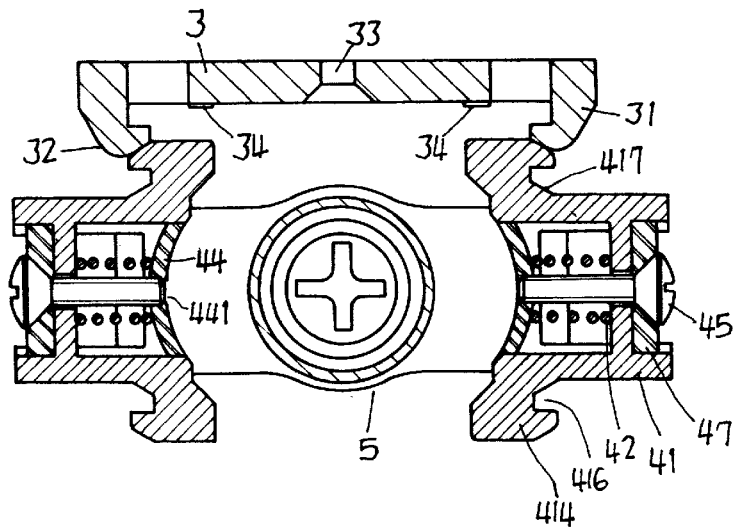
FIGS. 4, 5 and 6 are vertical sectional views illustrating the manner of fitting the fastener portion onto the catch portion of the snap-in bicycle pedal of FIG. 3 in a vertically downward direction.
Figure 5:
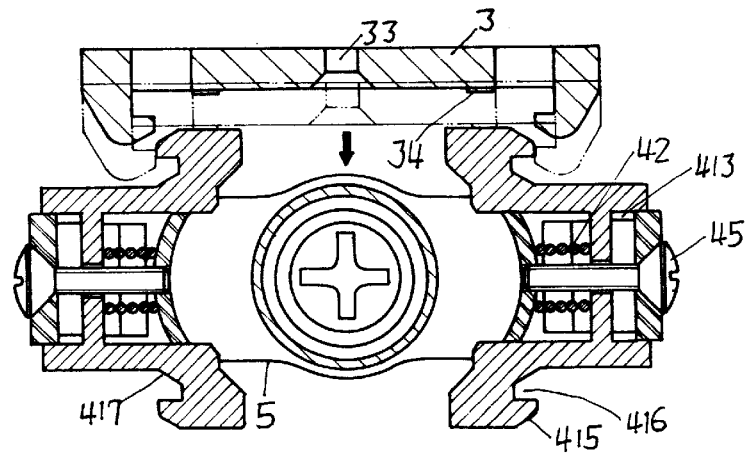
Figure 6:
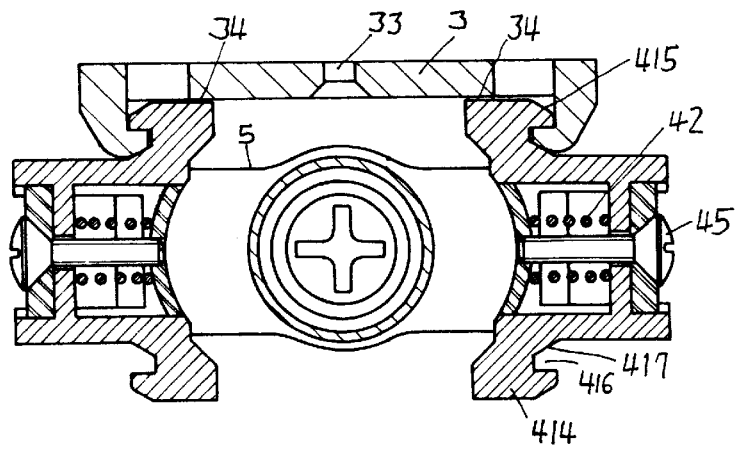

Please refer to FIGS. 4, 5 and 6 that shows the fastener portion 3 is directly pushed vertically downward against two catch lips 414 at the same side of the two catch bodies 41 in order to snap-fit on the catch portion 4. Since the retaining tongues 31 have curved lower outer edges 32 and the catch lips 414 have curved outer peripheries 415 around the cavities 416 below the catch lips 414, it would be very easy for the retaining tongues 31 to smoothly slide down to firmly engage with the cavities 416 and thereby connect the fastener portion 3 to the catch portion 4. When the fastener portion 3 has been snap-fitted onto the catch portion 4, the protuberances 34 abut on top of the catch lips 414, eliminating any play between the assembled fastener portion 3 and catch portion 4.

Figure 7:
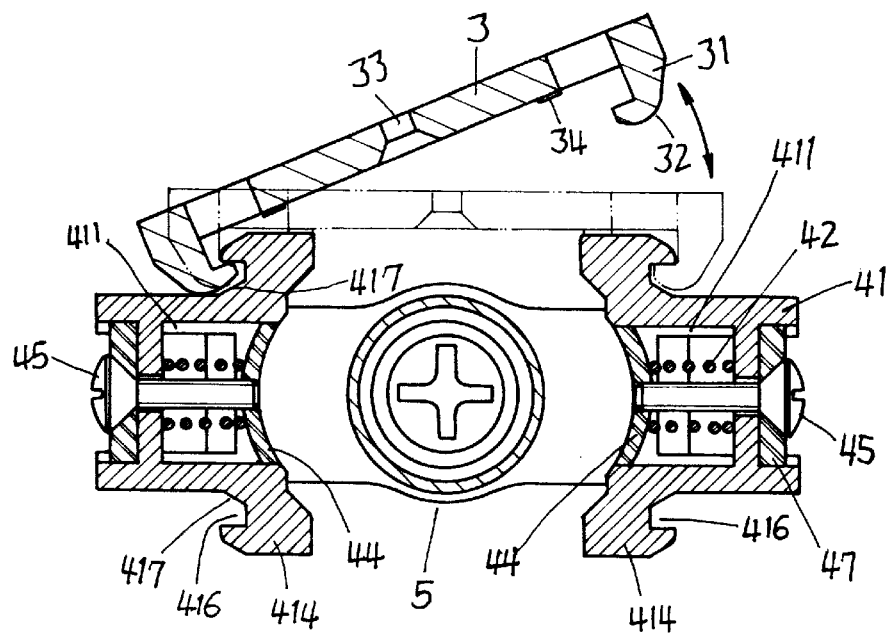
FIG. 7 is a vertical sectional view showing another manner of fitting the fastener portion onto the catch portion of the snap-in bicycle pedal of FIG. 3 by engaging the two portions at their front side first.
Figure 8:
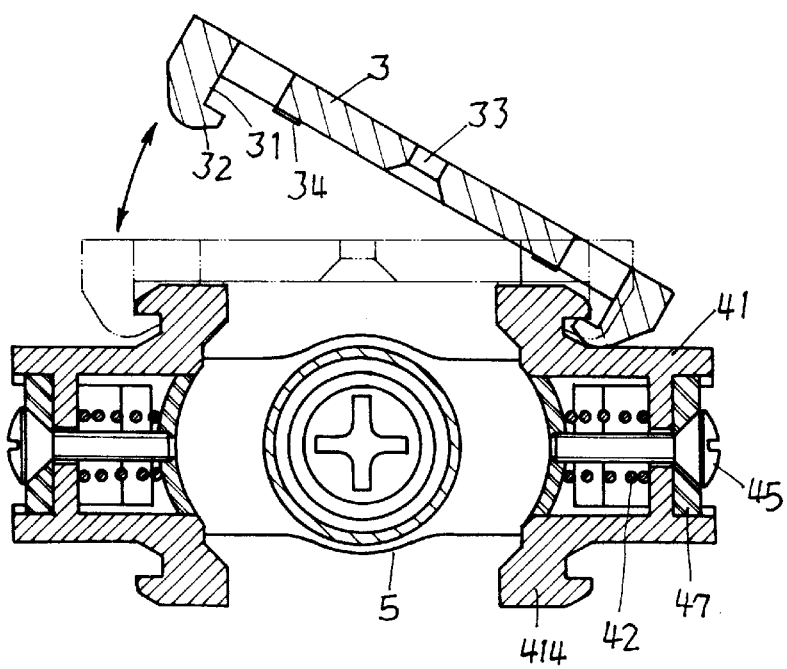
FIG. 8 is a vertical sectional view showing still another manner of fitting the fastener portion onto the catch portion of the snap-in bicycle pedal of FIG. 3 by engaging the two portions at their rear side first.

The fastener portion 3 may also be connected to the catch portion 4 in different manners as that shown in FIGS. 7 and 8.

In FIG. 7, the fastener portion 3 is connected to the catch portion 4 by inclining the former so that one retaining tongue 31 of which close to the front side of the pedal shaft 5 is first engaged with the catch lip 414 in front of the pedal shaft 5. Thereafter, the inclined fastener portion 3 is depressed for the other retaining tongue 31 to snap into the cavity 416 of the catch body 41 behind the pedal shaft 5.

In FIG. 8, the fastener portion 3 is connected to the catch portion 4 by inclining the former so that one retaining tongue 31 of which close to the rear side of the pedal shaft 5 is first engaged with the catch lip 414 behind the pedal shaft 5. Thereafter, the inclined fastener portion 3 is depressed for the other retaining tongue 31 to snap into the cavity 416 of the catch body 41 in front of the pedal shaft 5.

Figure 9:
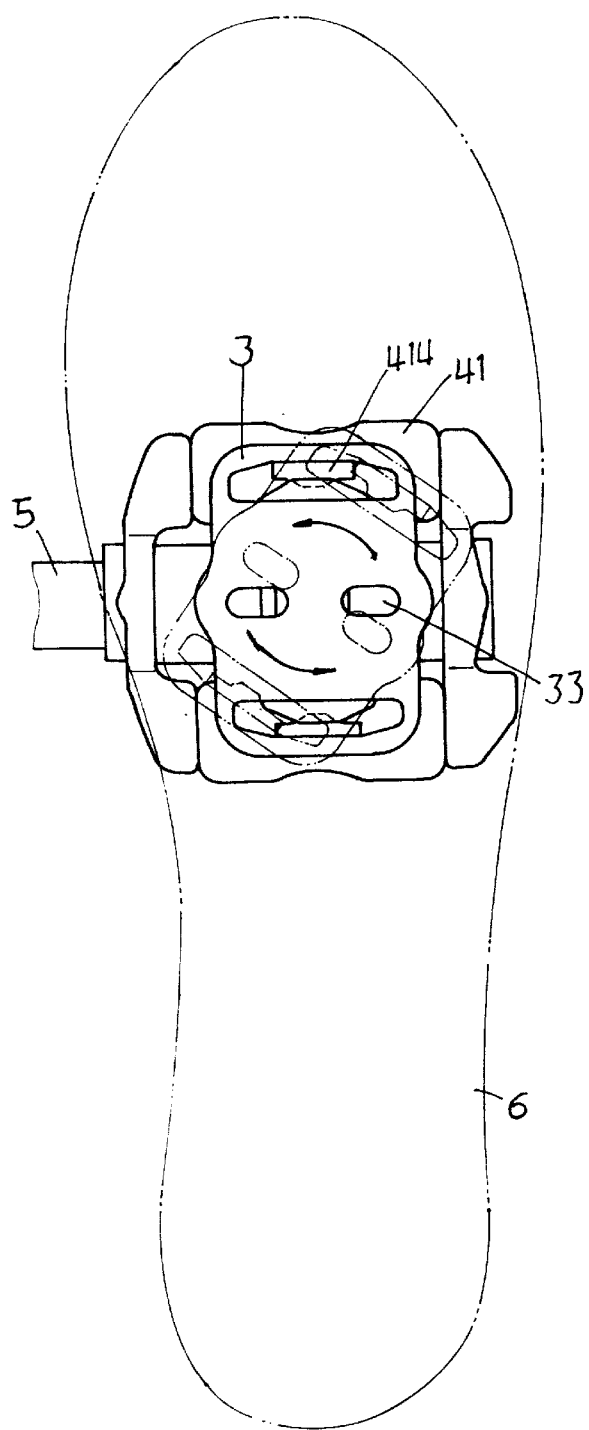
FIG. 9 is a top plan view showing the manner of disengaging the fastener portion from the catch portion of the snap-in bicycle pedal of the present invention by rotating the fastener portion.

When it is desired to disconnect the fastener portion 3 from the catch portion 4, simply rotate the fastener portion 3 in one direction, as shown in FIG. 9, and it could be quickly separated from the catch portion 4.

What is claimed is:

1. A snap-in bicycle pedal comprising a fastener portion, an elasticity-adjusting plate and a catch portion, said fastener portion being screwed to an underside of a sole of a bicycle show before being snap-fitted onto said catch portion, and said catch portion being screwed to said elasticity-adjusting plate for movement about a pedal shaft of a bicycle;

said fastener portion being provided at each of lower front and lower rear ends with a downward projected retaining tongue; and said catch portion being provided at least at a top side with two upward projected catch lips; and said catch lips being so designed that said retaining tongues snap-fit onto said catch lips from different directions or rotated to disengage from said catch lips easily;

wherein said catch portion includes two identical and symmetrical sets of components, said components in each set including a catch body, two compression springs, said elasticity-adjusting plate, an elasticity-adjusting screw rod, two screws, and a locking plate; and said two sets of components of said catch portion being assembled for separately fixedly mounted to a front and a rear side of said pedal shaft.

2. A snap-in bicycle pedal as claimed in claim 1, wherein said catch body defines a chamber of predetermined dimensions, one vertical side of said chamber facing said pedal shaft being an opening, and the other three vertical sides of said chamber, including a back wall thereof facing away from said pedal shaft, retreating inward to provide a U-shaped recess around said catch body.

3. A snap-in bicycle pedal as claimed in claim 2, wherein said catch lips are separately and symmetrically provided at a top of said two catch bodies close to said pedal shaft and define two cavities below said catch lips, three top edges of each said catch lip that do not adjacent to said pedal shaft being rounded and together giving each said catch lips a curved outer periphery, and each said cavity having depth and width matching with that of each said retaining tongue.

4. A snap-in bicycle pedal as claimed in claim 3, wherein said back wall of said chamber of each said catch body is provided with a through hole.

5. A snap-in bicycle pedal as claimed in claim 4, wherein each said elasticity-adjusting plate is provided with a threaded hole and has dimensions smaller than that of said opening of said chamber of each said catch body for said elasticity-adjusting plate to dispose in said chamber.

6. A snap-in bicycle pedal as claimed in claim 5, wherein said through hole provided on each said elasticity-adjusting plates is so located that said elasticity-adjusting screw rod extends thereinto.

7. A snap-in bicycle pedal as claimed in claim 4, wherein each said locking plate is so bent that said locking plate fitly embraces said U-shaped recess of each said catch body, said locking plate being provided with a central through hole corresponding to said through hole on said back wall of said chamber and to said through hole on said elasticity-adjusting plate, and said locking plate being provided at two outer ends with two through holes via which said two screws included in each set of said components of said catch portion are threaded into two threaded holes provided on said pedal shaft to screw said locking plate to said pedal shaft.

8. A snap-in bicycle pedal as claimed in claim 7, wherein said two compression springs in each set of said components are disposed in said chamber of each said catch body behind said elasticity-adjusting plate, and wherein each said elasticity-adjusting screw rod is sequentially extended through said through holes on said locking plate, said U-shaped recess of said catch body, and said elasticity-adjusting plate in said chamber of said catch body, so that said locking plate is fitly fixed in said U-shaped recess before being screwed to said pedal shaft, and that an extend by which said compression springs are compressed and a position of each said catch body relative to said fastener portion are adjustable by changing a depth by which said screw rod is extended into said through hole on said elasticity-adjusting plate.

* * * * *